Oct. 17, 1944. R. FINK 2,360,335
TRAILER HITCH STABILIZER
Filed March 17, 1943
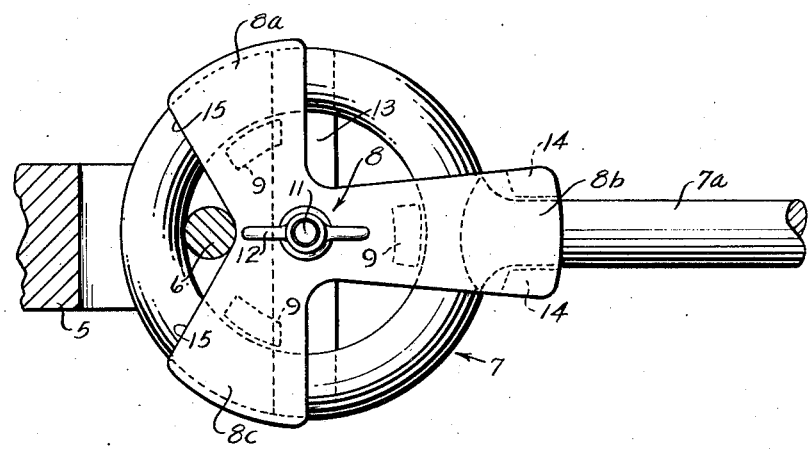
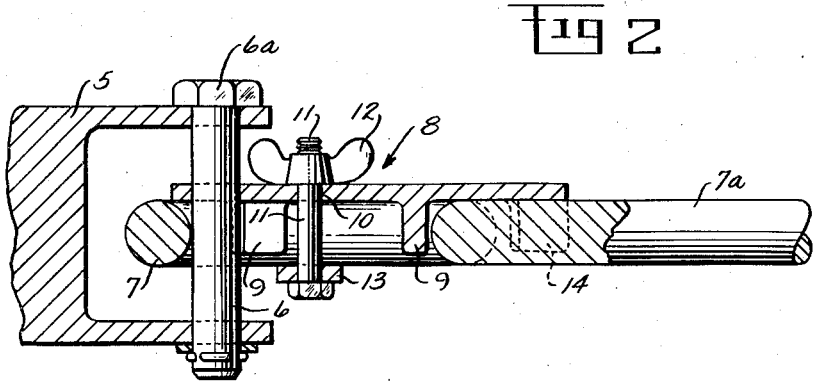
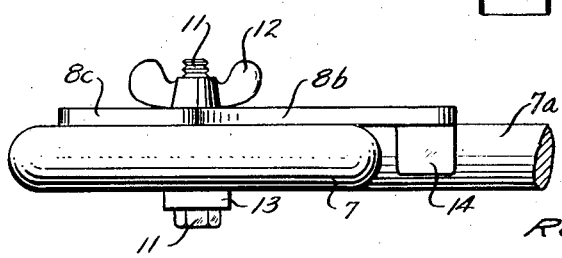
INVENTOR
RUDOLPH FINK Patented Oct. 17, 1944

2,360,335

UNITED STATES PATENT OFFICE 2,360,335

TRAILER HITCH STABILIZER

Rudolph Fink, United States Army, Fairfield, Ohio

Application March 17, 1943, Serial No. 479,447

4 Claims. (Cl. 280—33.15)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to trailer hitches and among other objects, aims to provide a device which when attached to the towing eye of the vehicle being towed, will eliminate whatever weaving and wandering of said vehicle that may arise from a loosely connected trailer hitch. Other objects of the invention are to provide an attachment of adequate strength which is readily put on and removed without special tools, which is inexpensive, easily made and of little weight. The preferred embodiment of the invention is used on Army air forces utility trailers, and permits the standard towing eye to be used with a small diameter pintle.

In the accompanying drawing—

Fig. 1 is a top plan view showing the attachment on a towing eye and engaging a pintle of small diameter;

Fig. 2 is a vertical sectional elevation; and

Fig. 3 is a side elevation, omitting the pintle and drawbar.

Referring particularly to the drawing, the drawbar 5 of the tractor vehicle carries a small diameter pintle 6 having a head 6a, said pintle being passed through the aperture of the standard towing eye 7 whose shank 7a is fixed to the trailer (not shown). Such a pintle is advantageous in that it is of light weight, but because of the looseness or play in the connection the vehicle, when towed, will weave and wander. Therefore, the attachment to be described has been devised.

Carried on the towing eye is a spider 8 comprising preferably three radial arms 8a, 8b, 8c, said arms each carrying a centering lug 9 on its underside and all of the arms being long enough to extend at least part way across the top of the towing eye. Centrally the spider is bored as at 10 for a clamping bolt 11 having a winged nut 12 to facilitate tightening. The head of bolt 11 engages a straight, flat clamping bar 13 which is about as long as the overall diameter of eye 7 and which lies on the underside of the towing eye. Thus by tightening nut 12 the spider is secured firmly to the towing eye, and lateral shifting is impossible because of the contact between the centering lugs 9 and the inside walls of the eye. If desired, lugs 14 depending from the end of arm 8b may contact either side of the shank 7a of the towing eye thus preventing angular movement of the spider on the eye. If the spider were permitted to shift angularly this would throw the trailer out of line, causing considerable weaving and side slipping.

Arms 8a and 8c each have a vertical face or wall 15 extending at an acute angle to the vertical medial plane passing through the towing eye. Walls 15 are symmetrically disposed relative to said plane and lie at an obtuse angle to each other. In other words the walls 15 together form a wide notch adjacent the forward end of the spider, said notch receiving the pintle and centering it. These centering walls, in co-operation with the adjacent portion of the inside wall of the eye, hold the pintle against shifting laterally within the eye, the pintle always having its axis substantially in the vertical medial or axial plane of the towing eye. As long as the spider is clamped upon the eye, the line of pull, transmitted through shank 7a, will pass through the center of the pintle. Expressing the matter otherwise, the line of pull transmitted by the pintle to the trailer is always through the longitudinal axis of shank 7a due to the centering of the pintle in the vertical plane of said axis. Obviously if any play or looseness develops in the connection, walls 15, being symmetrically disposed and convergent toward said axis, will continually tend to center the pintle. Since the line of pull is along the axis of the towing eye shank, there is no tendency of the trailer to weave or wander as it is pulled along a road, and travel of the trailer is more or less stabilized.

While the described attachment may remain permanently on the towing eye, it is easily removed without special tools. The pintle may be manually withdrawn at any time from the drawbar 5 to disconnect the trailer, without interference from the attachment.

Obviously the invention may have many forms neither shown nor described. For instance, it is unnecessary to employ a "spider" or multi-armed member. Also the clamping means may be varied considerably, within the scope of the appended claims. The essence of the invention is believed to be the provision of means secured to a towing eye (or its equivalent) and acting to hold a small diameter pintle centered and substantially immovable on the towing eye, so that the line of pull is directly through the shank of the towing eye, with no sidewise component tending to make travel of the trailer uncertain or unstable.

What is claimed is:

1. An attachment for a trailer hitch of the type employing a pintle and a towing eye, comprising two members adapted to be placed respectively above and below the eye and clamped together so as to be immovable thereon; one of the members having a pintle-receiving notch which is so located and of such dimensions that the pintle is closely confined between the notch and the inner wall of the eye so that lateral movement of the pintle within the eye is practically prevented.

2. The invention according to claim 1, wherein the notch comprises two convergent walls at an obtuse angle to each other; the apex of said angle lying substantially in the vertical longitudinal axial plane of the towing eye; said convergent walls operating to center the pintle in said axial plane, so that the pull from the pintle is straight through the shank of the towing eye.

3. An attachment for a trailer hitch of the type employing a pintle and a towing eye, said towing eye consisting of a shank and an eye at one end of the shank, comprising means carried on the towing eye and having two walls which are symmetrically disposed relative to the vertical medial plane passing through the towing eye, portions of the walls being at right angles to the general plane of the eye, said walls being sufficiently spaced from the inside wall of the eye to permit a pintle to be interposed between said walls so that a tractor vehicle may be attached to the towing eye; and means securing the first named means rigidly upon the towing eye, so that the angular relationship of said walls to the towing eye is permanently maintained, the angularity of the walls being such that the line of pull of the tractor vehicle is directly through the longitudinal axis of the shank of the towing eye.

4. In combination, a trailer towing eye consisting of a shank and an eye at one end of the shank; a pintle adapted to be passed through the eye to connect the towing eye to the tractor vehicle; said pintle being of small diameter compared to the inside diameter of the towing eye; an attachment adapted to be carried on the towing eye and engaging the pintle to hold the pintle centered relative to the shank of the towing eye; clamping means to secure the attachment immovably upon the towing eye; and means integral with the attachment and engaging opposite sides of the shank of the towing eye to obviate any substantial angular movement of the attachment on the eye.

RUDOLPH FINK.